June 30, 1942.  S. SCHIFF  2,288,424
BAKERY EQUIPMENT OR THE LIKE
Filed June 14, 1940  6 Sheets-Sheet 1

INVENTOR
SIGMUND SCHIFF
BY Zugelter and Zugelter
ATTORNEYS

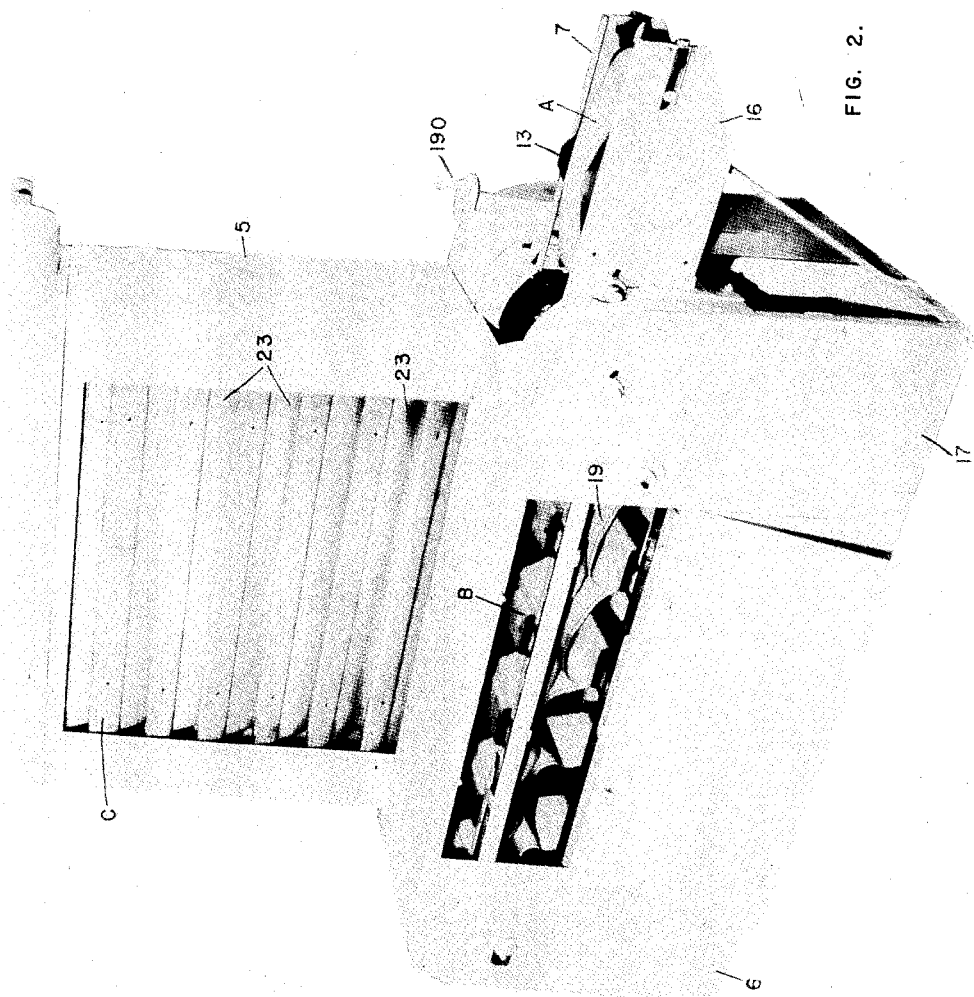

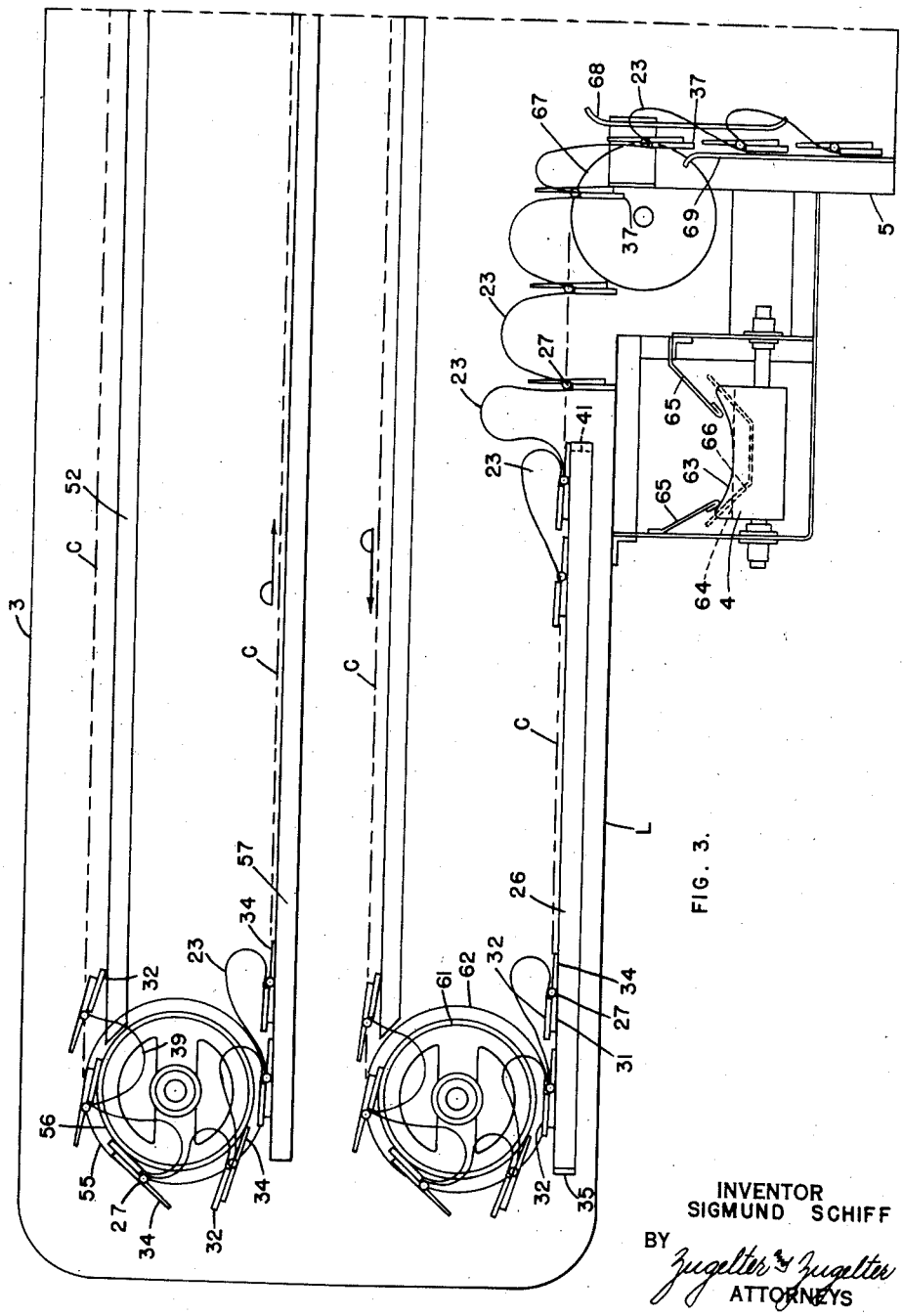

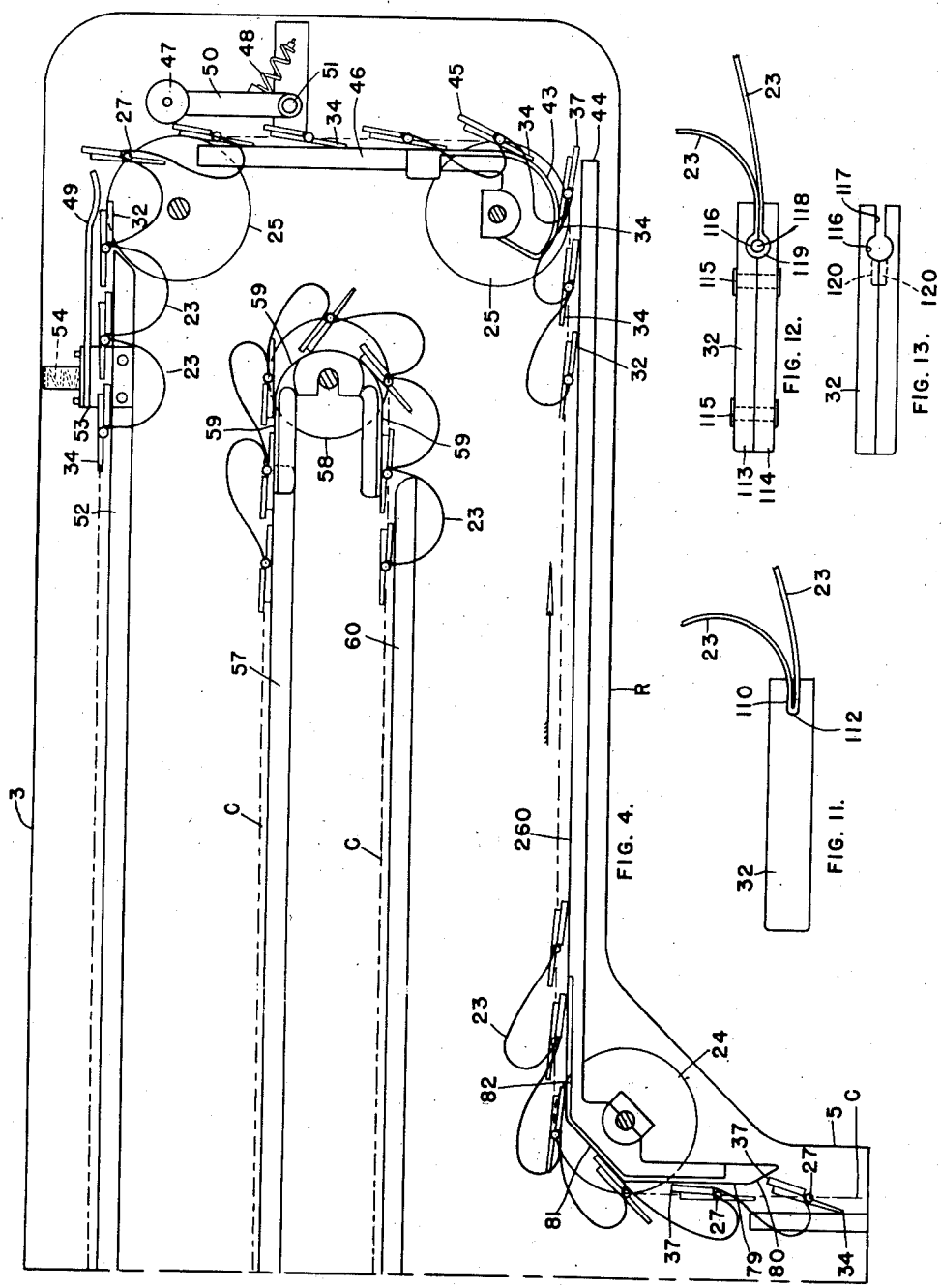

June 30, 1942.    S. SCHIFF    2,288,424
BAKERY EQUIPMENT OR THE LIKE
Filed June 14, 1940    6 Sheets-Sheet 5
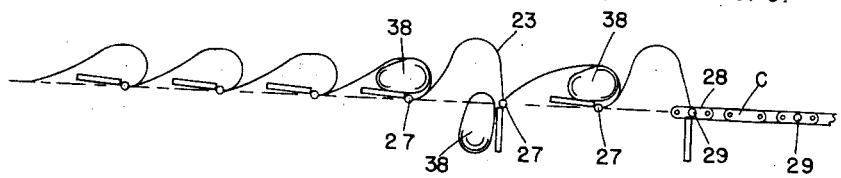
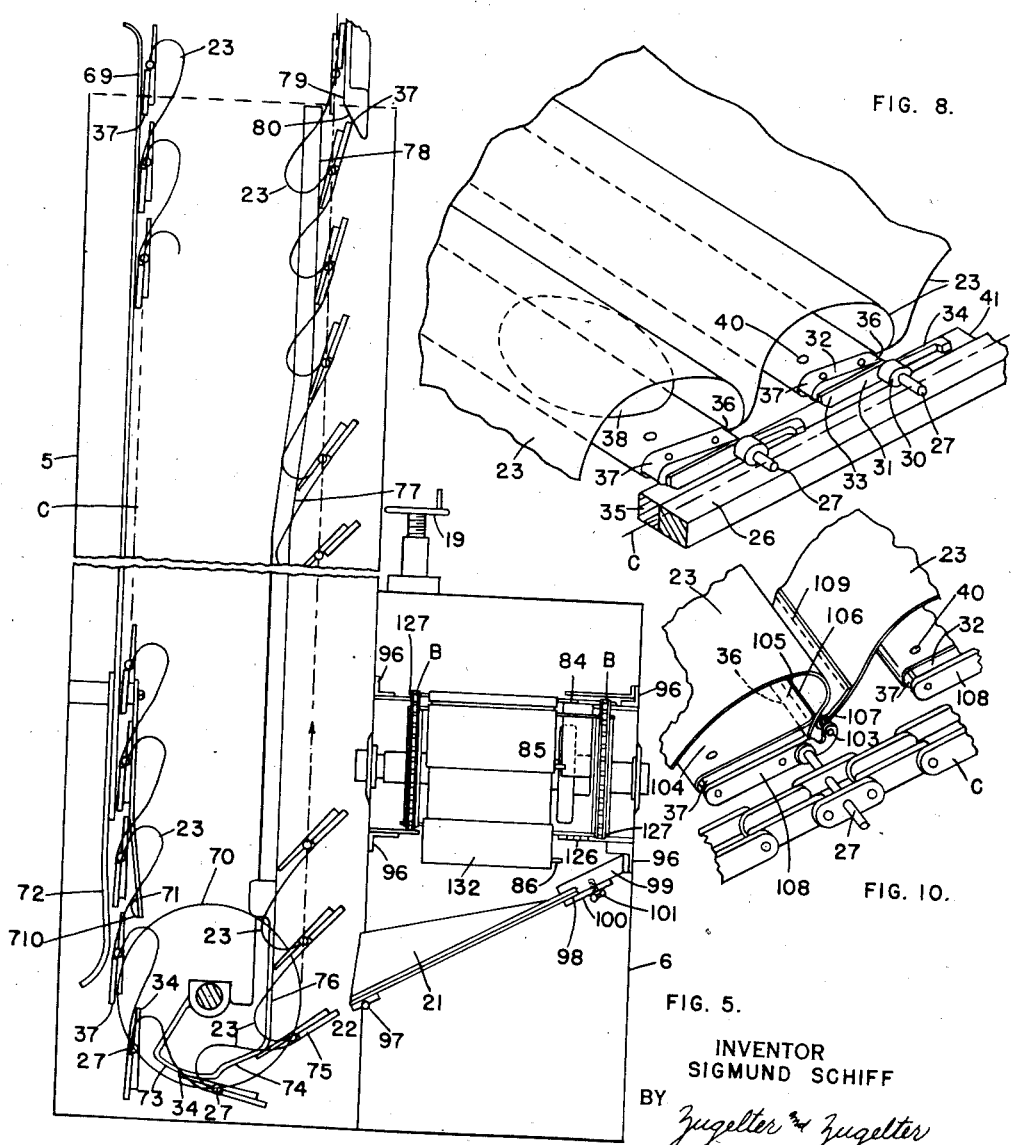
INVENTOR
SIGMUND SCHIFF
BY
Zugelter & Zugelter
ATTORNEYS June 30, 1942.　　　　S. SCHIFF　　　　2,288,424
BAKERY EQUIPMENT OR THE LIKE
Filed June 14, 1940　　　　6 Sheets-Sheet 6

INVENTOR
SIGMUND SCHIFF
BY
Zugelter and Zugelter
ATTORNEYS

Patented June 30, 1942

2,288,424

UNITED STATES PATENT OFFICE 2,288,424

BAKERY EQUIPMENT OR THE LIKE

Sigmund Schiff, Cincinnati, Ohio, assignor to The J. H. Day Company, Cincinnati, Ohio, a corporation of Ohio Application June 14, 1940, Serial No. 340,490

25 Claims. (Cl. 198—153)

This invention pertains to bakery equipment or other apparatus of a similar nature, wherein dough lumps or other articles require a similar type of handling and transfer, automatically, over a prescribed route or circuit.

As it will be at once appreciated that dough lumps or parcels of plastic material constitute but one of many articles that may be handled by the apparatus to be herein disclosed, it will be convenient to describe the invention with respect to a specific application thereof, for example in the bakery machinery art, upon the understanding however that the same may readily find application to other arts wherein the handling and transferring problem is similar. Accordingly, the teaching of the present invention will be offered in an exemplary manner, by assuming application thereof to a dough proofer, which happens to include a horizontal conveyor, an elevator, a feeder, a grouping apparatus, and return paths for conveyor direction changes, these examples representing practically all phases of article transfer conditions encountered in the various arts to which the invention may be applied.

One object of the invention, is to enable transfer of articles from one section of a composite proofer to another, and to subsequent machines, in definite timed sequence or tempo, so as to maintain a smoothly operating bakery set-up wherein one machine or section will not operate ahead of or behind another, and accordingly, it will then be possible to eliminate shut-downs and to keep every machine operating continuously and dependably to produce a given or specified production output. This is accomplished by adequate article control, which is an important characteristic of the invention.

Another object of the invention, in addition to adequate control, is that of simplifying the control elements of a conveying system so as to reduce initial cost, subsequent operating cost, and maintenance expense.

A further object is the simplification and elimination of parts, in a proofer or other conveying system, resulting in substantial decreased weight and size of the entire machine, compared with previously known machines of the same capacity and performing the very same functions.

Another object of the invention, when applied to a proofer or the like for dough lumps, is to make possible the use of much thinner and cheaper canvas or duck loops in the conveyor sections than has been possible heretofore, and to so shift the thin loops and their contents, that opposite faces of the loops are readily kept in a dry condition, all of which favors the use of but little or no dusting flour on the dough lumps to prevent sticking or adhesion of the lumps to the loops during the proofing and transferring operations.

A further object of the invention is to reduce by approximately twenty per cent, the amount of conveyor chain and loop material required in a proofer of a given capacity, thereby to materially reduce the weight, size, cost, and maintenance expense of the proofer, while at the same time increasing its efficiency. Sprocket sizes are also reduced, and elements heretofore considered indispensable are eliminated entirely, with the same advantages.

Other objects are: to eliminate the need for a gate at the discharge station of a proofer; to utilize the weight of the dough lumps in effecting the discharge; to reduce the distance between successive loops and yet secure a larger charging and discharging mouth for each loop; to stabilize and strengthen the conveyor structure by the use of slats, incidental to improving the loop formations and their operation; and to prevent the formation of so-called "doubles," in the conveyor system of a proofer.

The foregoing and other objects are attained by the means described herein and disclosed in the accompanying drawings, in which:

Fig. 2 is an enlarged pictorial perspective view of the charging and elevating mechanism at the lower portion of the proofer illustrated by Fig. 1.

Fig. 3 is a front elevational view principally diagrammatic, showing the left end of the overhead proofer section of Fig. 1, with non-essential parts of the enclosure omitted.

Fig. 4 is a view similar to Fig. 3, showing the right end of the overhead proofer section.

Fig. 5 is a diagrammatic end view, casing details omitted, showing the elevating section represented at the upper half of Fig. 2, and the charging mechanism for the elevating section.

Fig. 8 is a fragmentary perspective view of a loop-type conveyor constituting a major part of the invention.

Fig. 9 is a diagrammatic view indicating various positions of the Fig. 8 loop or pockets.

Fig. 10 is a view similar to Fig. 8, showing a modification.

Figs. 11, 12 and 13 are end views of alternative loop constructions.

Figure 1:
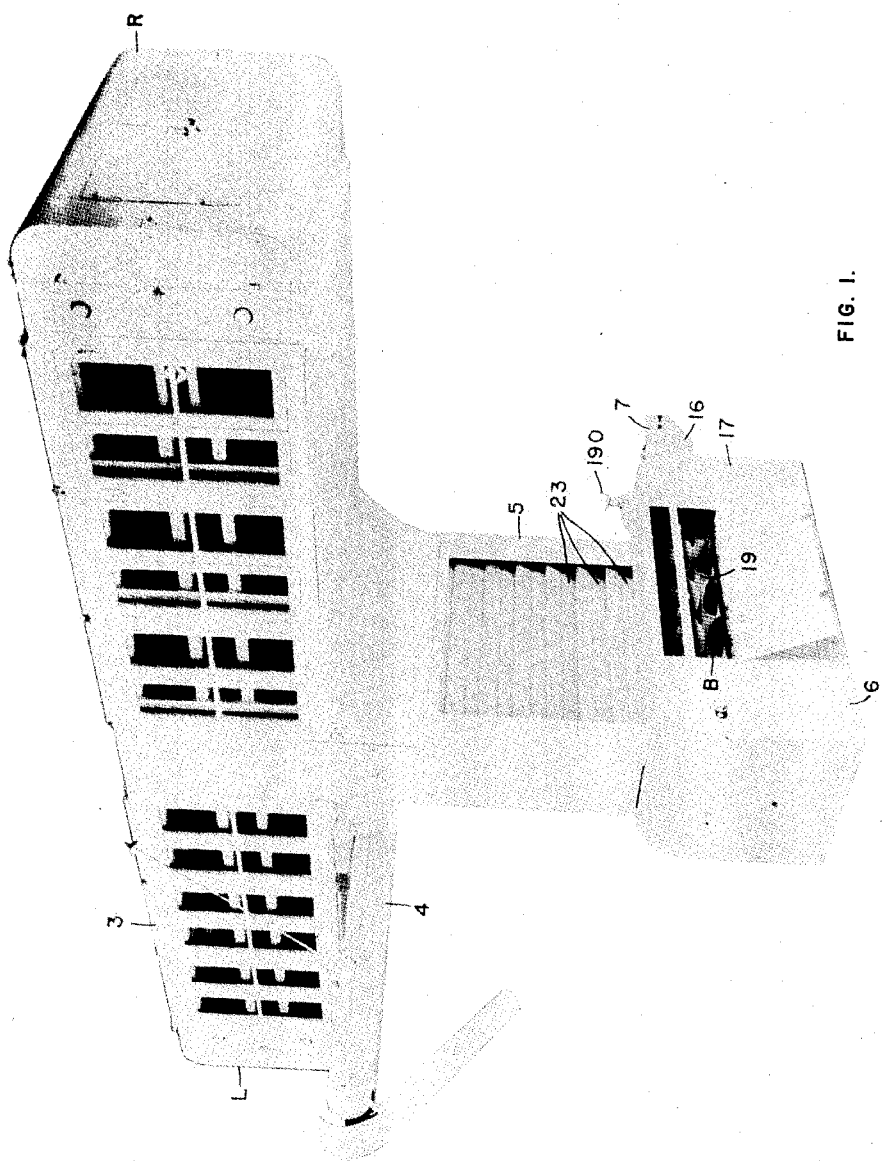
Fig. 1 is a pictorial perspective view of a complete proofer, representing one form of a practical installation, equipped with the means of this invention.

Referring to Figs. 1 and 2 of the accompanying drawings, the character 3 indicates an overhead proofer section having a left end L and a right end R. Beneath one of the proofer sections, in this case section L, there is located a discharge station 4 for lumps of dough or other articles which have passed through the serpentine or circuitous interior of the proofer sections. A proofer ordinarily will include an elevator section, herein represented by the character 5, and a loading section 6 for the elevator. In the present embodiment, the loading section includes means for accumulating a group of dough lumps from a feeder 7, and for depositing a group of accumulated lumps simultaneously onto or into the elevator, with a timed sequence of regularity.

The proofing machine herein illustrated, includes a feeding conveyor A, an elevator loading conveyor B and a proofing conveyor C. The conveyor C constitutes both the elevator and the proofing conveyor. The interior of the entire machine shown in Fig. 1 may be visualized by the reader, upon arranging Figs. 3, 4, and 5 of the accompanying drawings in the relationship corresponding to the proofer sections as combined in Fig. 1.

It will be unnecessary to describe in detail the feeder 7, as feeders of this type are well known in the art. Accordingly, it may be stated that the feeder comprises an endless power driven conveyor A, operating over a pair of rotating pulleys or drums 12, one of which pulleys or drums is driven. By means of a trough-shaped plate or guide 13, the opposite edges of the upper run of the conveyor A may be elevated so as to center a succession of dough lumps fed thereto from a dough molder or other lump preparing machine, for introduction singly and regularly into the series of pockets 14 of a picker drum 15. The picker drum, as well known, is rotated continuously and at a constant speed, for the purpose of transferring dough lumps from the feeding conveyor A to the loading conveyor B, in synchronism with the movement of the loading conveyor. The frame 16 of the feeder may be mounted onto the frame 17 of the accumulator-loader mechanism, by means of a suitable bracket 18. The character 19 indicates a hand wheel or other controller for a change speed mechanism (not shown), whereby the movement of the feed conveyor A may be varied in order to accommodate the feed to dough lumps of different sizes and characteristics.

Figures 6, 7:
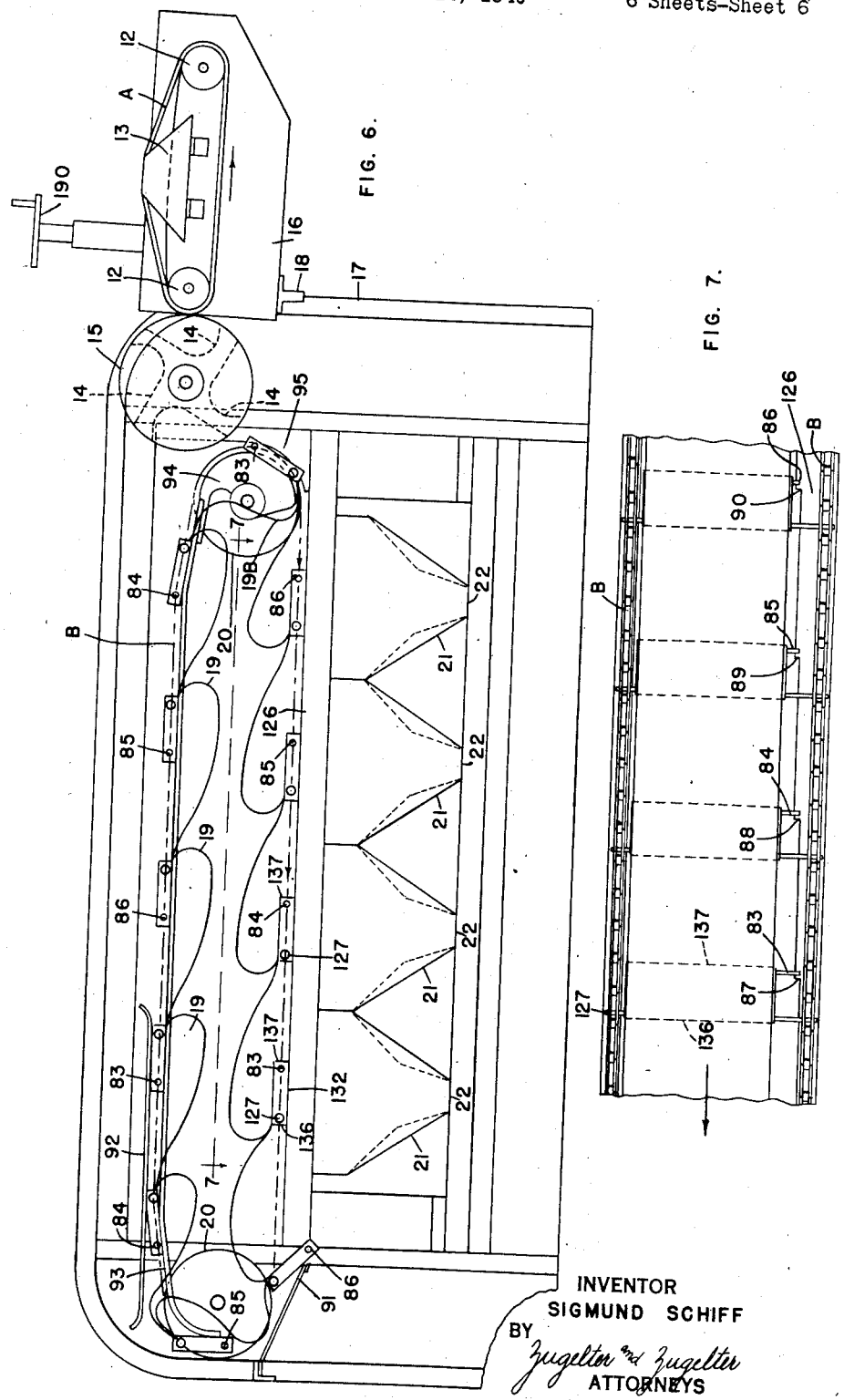
Fig. 6 is an elevational view of the charging section shown at the lower half of Fig. 2, non-essential parts of the casing being omitted.
Fig. 7 is a cross-sectional view taken on line 7—7 of Fig. 6, casing non-essentials omitted.

As will be understood from an examination of Fig. 6, the picker drum deposits dough lumps singly and in regular sequence, into a series of loops or pockets 19 of the loading conveyor B. The loop or pocket indicated at 19B of Fig. 6, is shown in readiness to receive a dough lump from one of the pockets of the picker drum. The sprockets 20—20 which support the conveyor chain are driven in a clockwise direction, in synchronism with the picker drum, for carrying the succession of pockets or loops one by one past the drum, for charging the pockets or loops with dough lumps. As will be explained, the charged pockets or loops are carried along by conveyor B, and when a group of them (in this case four) is located over a group of chutes 21—21—21—21, they are simultaneously dumped of their contents, for delivery to the elevator conveyor.

From the foregoing, it should be understood that the feeder and loader of Fig. 6, indicated at 7 and 6 in other views, perform the function of loading the elevator 5 with groups of dough lumps as the elevator pockets or loops 23 of conveyor C pass the lower ends 22 of the several chutes 21 (Fig. 5). Although the elevator loops 23 in the particular example shown, are adapted to receive four lumps each, from the loading mechanism, the number of lumps accommodated may be increased or decreased as required. The lumps deposited in the loops simultaneously by the action of the loader, will be spaced apart in the loops 23 a distance determined by the spacing of the chutes from one another. The elevator loops are carried past the charging chutes 21 in synchronism with the discharging operations of the loader, so as to successively charge the elevator loops with groups of dough lumps.

The description will hereafter refer back to the loader structure, as an explanation of the elevator and proofer construction will clarify certain phases of the loader details, especially as concerns the loops or pockets 19.

With reference to Fig. 4, it will be noted that the uptake run of the conveyor C passes over a sprocket 24, and extends to the right for passing about the two end sprockets 25—25 of proofer section R. From the upper sprocket 25, the conveyor chain extends to the left and enters the opposite end of the proofer.

The character 260 indicates a rail or track for supporting the chain links of the conveyor C along the horizontal distance between sprocket 24 and sprocket 25. The track or rail may be made of hardwood or other suitable material, it being understood that the chains at the front and rear of the proofer will each ride upon a track or rail such as 260. In this connection, see Fig. 8, wherein is shown a section of the track or rail, and its relationship to a plurality of loops or pockets constituting the conveyor C. In Fig. 8, the chain is omitted, but the pins 27 which extend through certain links of the chain, are shown above the track.

It is important that the structure of the conveyor be understood at this point in the description, wherefore reference is to be had to Figs. 8 and 9. As shown in Fig. 9, the conveyor C includes a chain constructed substantially in the manner of a bicycle link chain, although of larger size. Certain of the links, such as 28, are apertured as at 29 to receive the extending pins 27 of the loop or pocket formations disclosed in Fig. 8. The distance between adjacent pins 27 may approximate 6", so that about every fourth link of the chain will be apertured as at 29 to receive a pin 27. As shown, the pin 27 of each loop or pocket structure extends from a boss 30 formed on a casting or forging 31 which is adapted to carry a dump shelf 32 that extends across the width of the proofer, from one conveyor chain to the other. Fig. 8 shows one end of the structure, which is duplicated at the opposite end of the dump shelf.

The part 31 has a shelf supporting end 33 to which the adjacent end of the dump shelf is fixedly secured, whereas at the opposite side of pin 27 there is formed a guide finger 34 extending in a generally opposite direction. An inner track 35, which parallels the track or rail 26, may be provided as a separate element for supporting the dump shelf bracket 31 as the chain carries the succession of loops or pockets along the circuit of the proofer.

It will be noted that the dump shelf 32, which may be merely a slat of hardwood or other material, has an inner edge 36 which constitutes the pivotal edge of the dump shelf, the opposite edge 37 being a swingable terminal edge capable of describing an arc whose center of swing is the axis of pin 27. Thus, as illustrated by Fig. 9, the dump shelf may swing from a horizontal position to a substantially vertical position, for dropping a dough lump 33 whenever the dump shelf bracket is unsupported by a track or rail such as 35. As long as the dump shelf bracket is riding upon the rail 35, however, the shelf will move horizontally while supporting substantially the entire weight of the dough lumps superposed thereon. The character 23 in each instance, indicates a flexible sheet constituting a loop or pocket, which sheet may be formed of a continuous length of fabric or other suitable material. If desired, the flexible sheet 23 may be formed about each dump shelf slat 32, and fixed thereto by means of rivets 40 or any equivalent fastening device. In this manner, a long strip of flexible sheeting may be formed into loops or pockets, each having a hem in which a slat 32 is contained.

An important feature of the loop or pocket structure of this invention, is that the dump shelf at times supports the weight of the several dough lumps being conveyed through the proofer, so that by reason of a mere turning movement of the dump shelf about its pivotal support 27 to a substantially vertical position, there will result a definite discharge of dough lumps from the loop or pocket structure. In this connection, it may be assumed that the loop structure of Fig. 8 is moving to the right along the rails 35 and 26, and from this it will be observed that as soon as the end 33 of the bracket 31 passes beyond a break or terminal end 41 of the track or rail 35, the swingable terminal edge 37 of the dump shelf will be unsupported, and will fall by gravity to a substantially vertical position, thereby to dump the dough lumps which may have been supported thereon while the dump shelf was traveling horizontally. The weight of the dump shelf, together with the weight of the dough lumps thereon, renders positive the dumping action, and as will be understood, the dumping action will be accomplished without utilizing any of the power applied in moving the conveyor through the proofer. The power requirements of the machine therefore, are substantially reduced, to conserve operating expenses. In this connection, the reader might refer to my issued Patent #2,125,654 dated August 2, 1938, for a comparison showing that the dumping operation has been greatly simplified in the instant machine, without robbing the conveyor drive means of any of its power. The present invention obviates the need for trips or complex dumping mechanism of the character disclosed in Figs. 8 and 9, and as indicated at the discharge port of the machine shown in Fig. 2 of said issued patent. In the present invention, the rigid shelf or slat forms a substantial area of its associated loop or pocket, and its swingable terminal edge 37 controls the pocket mouth size. It is important to note that the dump shelf is pivoted to the conveyor chain, at a point remote from the swingable terminal edge 37, thereby to establish a normal tendency of the dump shelf to swing by gravity, to the inverted condition of the pocket or loop, as shown in Figs. 3, 8 and 9 of the accompanying drawings.

It should be understood that the lower edges of the chain links ride upon the rail 26, whereas the dump shelf parts 31 ride upon an adjacent section of track 35 so long as the shelves are to remain horizontal, or substantially so, in the carrying of dough lumps upon them. The part 31 which fastens to the slat or shelf member 32, preferably supports the slat in a slightly inclined condition, while said part 31 rides flatly upon the rail 35, merely for the purpose of ensuring that the lumps will not accidentally roll or bounce from the slat or shelf member during transportation through the machine.

Because of the manner in which the slats are hinged to the chain and coordinated with the loop material, the mouth of each loop can be opened wider and the dough lumps introduced and discharged therethrough with greater facility and certainty, than is possible in my earlier construction disclosed in Patent No. 2,125,654. Moreover, the distance between pins such as 27 may be shortened by approximately twenty percent, thereby conserving about the same percentage of loop fabric and conveyor chain, and reducing the size of the proofer proportionally. Of even greater advantage is the fact that an extremely stiff and heavy fabric is not required in the instant loop conveyor, and therefore the cost is greatly reduced. The thinner fabric is more easily kept dry and free from the tendency to adhere to the dough lump skin. The greater facility with which my present loop can be dumped, is readily apparent by comparing Fig. 9 with Fig. 9 of my previous patent disclosure above mentioned, no power being required to start or complete the dumping action in the instant embodiment.

Fig. 9 shows alternate loops being dumped, as is sometimes desirable when a proofer is made very large and required to discharge from two discharge stations. This is readily provided for by laterally offsetting alternate ones of the dump shelf parts 31, and furnishing separate parallel tracks 35 having terminal ends 41 located at different points along the chain track where the dumpings are to occur.

Continuing with the circuit of Fig. 4, we observe the loops or pockets 23 approaching the lower sprocket 25, where the conveyor executes an upturn. Each loop structure upon reaching this sprocket, has its guide finger subjected to the turning action of a stationary arcuate cam 43, upon the periphery of which the fingers ride as the conveyor chain carries the loop structures upwardly around the sprocket. The cam 43 is seen to lift the advancing free edge 37 of the dump shelf from the track 26 at its end 44, and to project it upwardly as at 45. Continued upward movement of the loops along with the conveyor chain, brings them to the upper sprocket, where the direction is changed to the left, in a horizontal plane parallel to track 26.

By preference, though not of necessity, a suitable stationary guide 46 may be provided for the guide fingers 34, to maintain a definite upright position of each dump shelf as it approaches the upper sprocket. This guide 46 may be necessary, when small dough lumps carried in the loops, are of insufficient weight to maintain the upright condition of the dump shelves. Under such circumstances, it may be desirable to also furnish an auxiliary pusher wheel or roll 47 acting constantly, under the force of a compression spring 48, to bear against the swingable portions of the shelf structures in succession for righting them to the vertical position preparatory to entry under a horizontal guide 49. The freely rotating roller 47 may be mounted upon an arm 50 having a pivotal mounting 51 upon the frame of the proofer.

As will readily be understood, the upright dump shelf which has passed the roller 47 will be carried by the conveyor chain to a position at which some part thereof will strike the free end of guide 49 and be rotated thereby about its pivot pin 27 in a clockwise direction. Such action folds down the shelf and conditions it for entry into the space between the guide 49 and the horizontal track or rail 52. The loop structures when reaching the track or rail 52, advance to the left, with their guide fingers 34 foremost, and their fabric pockets 23 pendent like a basket or bag containing the dough lumps undergoing proofing.

The guide 49 may be in the form of a bar or strap of metal or other material, having a base end 53 cushioned by means of a spring 54 so as not to bind upon the loop shelves, as the latter pass beneath the guide and onto the rail 52. The rail structure at 52 may be the same as is illustrated at 26—35 of Fig. 8, to guide and support the conveyor chain and the bracket ends of the dump shelves as they travel slowly therealong.

With reference now to Fig. 3, which illustrates a continuation of the proofer, or its left end, we observe the pockets or loops approaching a sprocket 55 about which the conveyor chain passes to carry the loops back to the right end of the proofer. Here, at sprocket 55 is provided a circular cam 56 arranged concentrically with the sprocket and in position to contact and guide the swingable portion of the shelf or slat around the sprocket periphery. The cam serves to maintain the leading positions of the guide fingers 34, so that by the time the loop structures reach the guide rail 57, the loops are inverted and the dough lumps are resting upon the slats or dump shelves. It should here be noted that the dough lumps are now resting upon shelf faces which have not yet been contacted by the dough, as the shelves are inverted with respect to the positions previously assumed by them while riding upon the rails 260 and 52 of Fig. 4. Accordingly, it will be understood that the dough lumps have been rolled and shifted each from one shelf face, along one loop surface, and onto the opposite shelf face. The shifting movements of the lumps affords different portions of the loop structures or pockets an opportunity to dry while passing through the proofer.

As the loop or pocket structures move to the right along guide rail 57, they approach the sprocket 58 of Fig. 4, where they are again inverted by the action of a stationary cam face 59—59—59, to result in disposition of the dough lumps into depending loops 23 beneath the rail 60.

The action of a cam 61 at sprocket 62 (Fig. 3), is the same as at 56, directly above. The loop structures then travel along the guide or rail 26, with the dough lumps resting upon the dump shelves 32 whose guide fingers 34 are foremost.

The loop structures now pass to the discharge station, which was described earlier herein with reference to Fig. 8.

At the discharge station, (Fig. 3) the guide rail for the brackets 31 is severed or terminated at edge 41, so that the mere weight of the dump shelves and the lumps carried thereon may automatically rotate the dump shelves about their pivot pins 27, to the depending or discharging position above the discharge conveyor 4. This discharge action is very simple, and is so positive and free of lump hesitancy or lag, as to obviate the need for any timing gate structures of the character indicated at 69 in my issued Patent No. 2,125,654, aforesaid.

This discharge conveyor 4 may be of any simple or known construction, consisting principally of an endless moving belt 63 operating over a pair of driven rollers 64. Guide plates 65 may be provided, if desired, to initially dispose the lumps upon the trough-shaped upper face of the endless conveyor belt. As in the feeder, the trough characteristic of the belt 63 may be afforded by a channel shaped plate 66 underlying the upper run of the belt.

The discharge conveyor belt 63 may be power driven in any suitable manner, and preferably through gearing from the main conveyor C (not shown). As all of the sprocket shafts for the proofer and elevator sections are capable of being "through" shafts, rather than stud shafts, any one of them may be selected as a main shaft for connection with a drive motor or other power source. The feeder and loader 7 and 6 may be suitably geared to a shaft of the elevator or proofer section, and be driven thereby in accordance with common knowledge and practice.

It is of importance to note that the decrease in the amount of flexible material needed in the loops of the instant machine, enables the loops to be made more shallow than heretofore, with the result that all proofer and elevator shafts may be made "through" shafts, without having the shafts interfere with the loops as the loops are carried around the sprockets. Under the circumstances, sprockets of a reasonably small diameter can be utilized throughout the machine, and of course, the elimination of sprocket stud shafts simplifies the frame construction and assembly of the machine while at the same time enhancing the rigidity and durability.

From the discharge station, the dumped pockets proceed, still in the dumped condition, to the elevator top sprocket 67. With the swingable terminal edges 37 of the dump shelves of the pockets in the depending state or condition, the pockets pass around the periphery of sprocket 67 and enter between suitable guides 68 and 69 which ensure that the pockets will descend in the elevator section with the dump shelves in the vertical depending condition and the loops 23 upstanding, as illustrated (Fig. 5).

As the pocket structures approach the lower sprocket 70 of elevator section 5, they encounter the guides indicated at 71 and 72, which condition them for acceptance by the sprocket periphery. As the structures or canvas loops pass along transverse bar 710 of guide 71, the bar wipes them and removes any humps or irregularities, so that the loops will pass on to the charging station in excellent condition for dough lump reception. As the structures reach the sprocket periphery, the depending swingable terminal edges 37 of the dump shelves are in a depending condition, which they tend to maintain because of their weight. A cam having a portion 73 which is substantially concentric with the sprocket, is located in the path of the guide fingers 34, to act upon the guide fingers for turning the dump shelves in a counterclockwise direction about their pivots 27, as indicated at the extreme lower end of the elevator section. By the time the dump shelves are in position to enter the ascending run of the elevator conveyor, the guide fingers 34 drop into a depression 74 formed in the periphery of the cam, which functions to substantially level off the dump shelves as they reach the discharge ends of the chutes 21, as indicated at 75. This leveling of the dump shelves results in establishing a wide-open mouth for each loop or pocket at the point where it is in position to receive dough lumps from the chutes 21, thereby to ensure adequacy of reception of dough lumps from the chutes to the elevator. An upstanding cam face 76, which is a continuation of cam face 74, acts upon the guide fingers to incline the dump shelves immediately after they have received a charge of dough lumps from the chutes. The guide 76 continues upwardly to maintain the inclined condition of the shelves, and at a point indicated by the character 77, the guide may gradually approach the conveyor chain with the result that the dump shelves are further inclined toward the vertical for substantially enclosing the dough lumps within the loops or pockets. It will be seen that the loops or pockets are nearly closed by the time they reach the upper portion of the elevator section shown in Fig. 5, and while the guide fingers continue to slide upon the upright section 78 of the guide 76—77. At 79, an additional guide rail may be positioned, having a tapered face 80 to act upon the swingable edges 37 of the dump shelves in succession, for disposing the dump shelves to a substantially vertical position, as indicated at the extreme upper end of the elevator. This is adequately illustrated at the lower left corner of Fig. 4.

The guide 79 follows substantially the periphery of the sprocket 24, but may be made somewhat angular as at 81 and 82, for finally leveling off the dump shelves into position for advancement thereof along the guide rail 260 as heretofore explained. The section 82 of the cam lies substantially in the plane of the guide rail 260, so that the dump shelves readily may continue their horizontal movement without interruption toward the proofer end-sprocket 25. It may be stated at this point in the description, that the guide 79—81—82 may be made arcuate, rather than angular, without alteration of its primary function which is that of transposing the dump shelf from the upright to the horizontal condition of advancement. It will be appreciated, of course, that the dough lumps will rest within the flexible loops as the loops ascend in the elevator section, whereas upon disposition to the substantially horizontal position upon guide rail 260, the dump shelves themselves will support the major portion of the weight of the dough lumps, thereby allowing the flexible loop material to break contact with the dough lump to induce drying of the loop material as heretofore explained.

In the loading mechanism of Figs. 6 and 7, the loop or pocket structures are constructed essentially upon the same principle as those of the elevator and proofer section conveyors. That is, each loop structure comprises a pocket formed of flexible sheet material extending from approximately the pivot point 127 of a slat or shelf 132, over to the corresponding pivot point of the next adjacent loop structure. Each slat or dump shelf has a pivot edge 136 and a swingable terminal edge 137 sufficiently heavy to gravitate to a substantially upright position when unsupported. The loop structures of the loading mechanism are distinguished generally from those of the elevator and proofer conveyors, in that they do not require the guide fingers 34. Instead, each dump shelf 132, in addition to its conveyor pivots 127, has a supporting pin which trails the pivot pin and normally maintains a horizontal position of the dump shelves upon the guide rail 126. The additional pins referred to are indicated at 83, 84, 85 and 86, this group of four pins and loop structures being furnished in three sets upon the conveyor B—B. The pins 83, 84, 85 and 86 of each group, are progressively shorter in the order specified, and each is adapted to ride upon a selected portion of the guide rail 126. The guide rail is stepped or notched at the locations 87, 88, 89 and 90, so that pin 83 will run off of the step 87, at the same instant at which pins 84, 85 and 86 run off of their respective steps 88, 89 and 90. It will accordingly be understood that, referring to Fig. 7, movement of the conveyor to the left will result in advancement of the loop structures relative to the stationary support rail 126 and subsequent dropping of the several support pins 83, 84, 85 and 86 from their respective supporting ledges which terminate at the notches or steps 87, 88, 89 and 90, respectively. When the four pins illustrated are relieved of their support by advancement of the loop structures past the steps of the support rail, the dump shelves will drop by gravity to a substantially vertical position, moving about their pivot pins 127 as they drop, thereby to dump their contents into the corresponding chutes 21—21—21—21. It will therefore be seen that no power-consuming trip mechanisms are necessary to effect dumping of any group of four loops simultaneously to the chutes which convey dough lumps to the elevator section. The dumping action is simple and certain, and there can be no hesitancy of the dough lumps in leaving the dumped loops or pockets. The result is a highly accurately timed feed of dough lumps to the elevator each time that a group of four loader loops is dumped by the simple action of the stepped guide rail and the supporting pins of varying lengths, carried by successive ones of each dump shelf of a group.

In view of the foregoing explanation, it will be evident that the dump shelves of Figs. 6 and 7 are about to release their contents to their respective chutes 21, assuming movement of the lower run of the conveyor to the left. The various illustrations disclose that the loop material in all instances is sufficiently stiff to influence the rounded-out shape of the pockets or loops, which is a desirable characteristic of the loop structures. Stiffness of the material at each slat hem aids the dumping and loading functions of the loops.

After the dump shelves which are shown above the chutes 21 of Fig. 6 have been released to the dumping position, they will advance in a pendent condition, toward the sprocket 29 where they will be contacted by a guide 91 which conditions them for passage to the upper run of the conveyor. An overhead guide 92, operating in connection with a lower guide 93, will level off the dump shelves in succession so that the loops 19 will advance toward the picker drum 15 in position for reception of dough lumps as previously explained. The guide 93 may extend from a location adjacent guide 91, to a location adjacent the picker drum 15. A substantially concentric cam 94 forms a continuation of guide rail 93, and in cooperation with an arcuate fixed cam 95, serves to guide the successive dump shelves onto the stationary rail 126 in a horizontal position favorable to the dumping action. The succession of pins 83, 84, 85 and 86 may be utilized in guiding the dump shelves between the arcuate cams 94 and 95.

The details of the loading mechanism are shown in end elevation upon Fig. 5, where it will be seen that the entire structure may be supported within a casing by means of angle members or other suitable supporting devices indicated at 96.

The group of chutes 21 may be formed into an integral structure, so that it may be supported near its end 22 upon a common pivot 97. The swinging end 98 of the chute structure may be held normally in its upper inclined relationship to a support 99, by means of one or more latch bars 100 which may readily be displaced by loosening one or more wing nuts 101 that engages screw threaded studs embedded in the support 99. By making the chute structure displaceable as stated, it is an easy matter to gain access to the interiors of the chutes, and to the charging station at the lower end of the elevator section, in the event that dough lumps become misdirected or confused during synchronizing of the loader with the feeder and the elevator, when setting up the machine for operation.

In conclusion, it is pointed out that the dump shelves are not necessarily pivoted exactly at their rear edges 36, as the pivot lines may be anywhere near said edges so long as the forward edges 37 can be swung, or can drop by gravity, when unsupported. The loops may extend from the rear edges 36 of the slats, or from the lines of stitching that form the hems which contain the slats. That the loops begin somewhere near the edges 36, is all that is required; for example, a separate bar or rod 103 paralleling each edge 36 would just as well support an end of one loop, while the adjacent end of the next loop is hemmed to receive a slat, as in Fig. 10. The appended claims are to be interpreted in the light of these observations.

It will be noted that the Fig. 10 illustration suggests how the successive loops may be formed and applied individually. The first loop has a hem 104 with a line of stitching 105, forming the hem, along a terminal edge 106 of the loop material. The stiffness of the loop material in the region of the stitched edge influences the shape and the manipulation of the loop as previously explained. The opposite end of a loop is merely hemmed about the transverse rod 103, as at 107, which rod extends along and in spaced parallelism with the rear edge 36 of a slat. Opposite ends of rod 103 may be supported by the metallic bracket or end piece 108 which carries the pivot pin 27, and which, in the proofer and elevator sections, would carry also the guide fingers 34 as heretofore explained. Part 108, in actual practice, would preferably follow the design of bracket 31 of Fig. 8, with the addition of perforate lugs for the support of the ends of rods such as 103. The character 109, Fig. 10, indicates a line of stitching that forms the hem 107 of the second loop. It should be noted that rod 103 is not upon the pivoting axis of the slat, but is spaced therefrom to swing through a small arc when the slat is dumped. This swinging action of the rod serves to control the loop distortions during the charging and dumping actions, thereby to enhance the operations. In a slight modification of Fig. 10, both loops might be supported upon the rod 103 by cutting away alternate portions of the hems in piano hinge fashion.

Figs. 11, 12 and 13 are end views showing different methods of associating canvas loops with the slats or shelves, other than by hemming and stitching them in accordance with the disclosures of Figs. 8 and 10. In Fig. 11, for example, the shelf or slat 32, which may be of hardwood or other acceptable material, has one of its longitudinal edges milled or grooved as indicated at 110, so that the fold 112 of adjacent canvas loop structures 23 may be inserted into the groove and cemented or otherwise fastened therein. After having secured the fold in place, the mechanic will apply to the end of the slat a bracket or casting such as is indicated at 31 of Fig. 8, or at 108 of Fig. 10, in order that the structure will include a pivot pin 27 for the mounting thereof upon a conveyor chain, at each end of the slat. It will be noted that the construction illustrated by Fig. 11 effects a saving of canvas loop material, as the slat 32 is left bare and exposed to contact with the dough lumps. The expense and labor of stitching the loop canvas may be eliminated accordingly.

In the Fig. 12 modification, the slat 32 is made up of two halves 113 and 114 held in face contact by means of rivets or other fasteners 115. These fasteners may be the same fasteners that secure the bracket or casting 31 to the slat in Fig. 8, if desired. Before joining the parts 113 and 114, each part is grooved to provide a half cylindrical recess 116 and an adjacent channel wall 117, so that the folded portion of adjacent loops 23 will be received in the resultant key-hole slot, and made to conform with the cylindrical portion thereof by the insertion of a bar or rod 118 which may extend the full length of the slat or shelf. It will be readily seen that once the slat parts 113 and 114 are secured together in clamping relationship upon the canvas eye 119 and the rod or bar 118, there is effected a permanent and durable connection between the slat and the canvas loop sections. As indicated in Fig. 13, a short hole 120 may be formed in the end of each slat part, to communicate with the cylindrical aperture 116 in order to accommodate the end of the rod or bar, in the event that it be desired to turn the end of the rod or bar at right angles to prevent longitudinal movement thereof through the groove or aperture 116. Both ends of the rod or bar would be turned as stated, and of course both ends of the slat would be recessed as at 120. As will be understood, the construction illustrated by Fig. 12 will securely hold the rod or bar 118 against longitudinal shifting movement if the clamping action of the fasteners 115 is sufficiently forceful. Like the structure of Fig. 11, the structures of Figs. 12 and 13 may be furnished with the necessary bracket or casting for furnishing a pivot pin, at each end of the slat, for connection thereof with the conveyor chain. In this connection see Figs. 8 and 10, which suggest alternative forms of brackets and pivot mountings.

The modifications referred to above are illustrative of the many other possible changes or alterations that may be resorted to throughout the machine. It is accordingly to be understood that various modifications and changes may be made, in the structural details of the machine, within the scope of the appended claims, without departing from the spirit of the invention.

In conclusion, particular attention is directed to the fact that the arrangement of elements in the machine provides for the transferring of materials along a tortuous path, wherein at certain times the materials being transferred rest substantially upon the stiffened portions or shelves of the loop structures while the flexible portions assume the position of a cover for the materials of each loop; and at other times the materials rest within the flexible portions of the loops while the shelves or stiffened portions overhang them as covers. This arrangement is particularly desirable in a dough proofer, since the dough lumps therein conveyed are alternately rolled from the one location to the other, thereby preventing sticking or adhering tendencies while at the same time providing for a uniform skin condition upon the lumps. The thickness of the skin is maintained at a minimum due to the covering function of the flexible loop portion and the shelves or stiffened portions thereof, alternately throughout the travel of the materials within the proofer. By maintaining a covered condition of the dough lumps throughout the travel period, the dough lumps are subjected to a minimum of moving air or drafts within the proofer, and this results in the formation of a desirable thin or delicate dough skin of uniform thickness and character. It has been found that dough lumps proofed in the machine of this invention will require a minimum of flour dusting both within the proofer and outside the proofer where the molding operation is performed subsequently to discharge of loaves from the proofer. The result is a better product, and one which is more tasty and salable than heretofore, which is an objective additional to the objectives previously specifically mentioned herein.

What is claimed is:

1. In a flexible loop-type conveyor, the combination which comprises a pair of spaced parallel driven elements movable in unison and forming the sides of the conveyor, dump shelves substantially spanning the driven elements and pivoted relative thereto at intervals along the driven elements, and a flexible loop for each dump shelf to overlie an article resting upon the dump shelf, said shelves each being of sufficient weight to dump the article resting thereon in the absence of support for one edge of the shelf.

2. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions are subject to gravitation to a pendent position for the dumping of articles supported thereon, and flexible loops of sheet material extending loosely from slat to slat, and fixed relative to the pivot edge portions only of the slats, whereby the slats in moving about their pivots control accessibility to the loops.

3. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions are subject to gravitation to a pendent position for the dumping of articles supported thereon, and flexible loops of sheet material arched longitudinally of and across the slats, from the region of the pivotal edges of successive slats.

4. In a flexible loop-type conveyor, the combination of a driven element and a series of dump shelves each in the form of an elongated slat having ends and opposed edges, means at an end of each slat for pivoting the slat to the driven element adjacent to one of said edges thereof, so that the opposite edge of the slat will swing about the pivot means, a loop of flexible sheet material arched longitudinally of and substantially across each slat, and means supporting each loop in the vicinity of the line of pivoting of each slat upon the driven element, so that the free edge of each slat may swing substantially independently of a loop associated therewith.

5. In a flexible loop-type conveyor, the combination of a driven element and a series of dump shelves each in the form of an elongated slat having ends and opposed edges, means at an end of each slat for pivoting the slat to the driven element adjacent to one of said edges thereof, so that the opposite edge of the slat will swing about the pivot means, a loop of flexible sheet material arched longitudinally of and substantially across each slat, means supporting each loop in the vicinity of the line of pivoting of each slat upon the driven element, so that the free edge of each slat may swing substantially independently of a loop associated therewith, a guide rail arranged in substantial parallelism with the driven element in position for normally supporting the slats in substantial parallelism with the driven element, said guide rail having a terminus providing a gap in the guide rail to deprive the slats of the support stated, and thereby effect a dumping action thereof by gravity.

6. In a flexible loop-type conveyor, the combination of a driven element and a series of dump shelves each in the form of an elongated slat having ends and opposed edges, means at an end of each slat for pivoting the slat to the driven element adjacent to one of said edges thereof, so that the opposite edge of the slat will swing about the pivot means, a loop of flexible sheet material arched longitudinally of and substantially across each slat, means supporting each loop in the vicinity of the line of pivoting of each slat upon the driven element, so that the free edge of each slat may swing substantially independently of a loop associated therewith, a guide rail arranged in substantial parallelism with the driven element in position for normally supporting the slats in substantial parallelism with the driven element, said guide rail having a terminus providing a gap in the guide rail to deprive the slats of the support stated, and thereby effect a dumping action thereof by gravity, and means operative subsequently to the dumping action for restoring a substantially horizontal position of the slats in readiness for the charging of the loops thereof with articles to be conveyed.

7. In a device of the class described, the combination of pairs of spaced sprockets arranged in two parallel planes, endless conveyor chains operating over the sprockets of each pair of sprockets for advancement in unison as the sprockets are rotated, a guide rail extending lengthwise of one of the chains to a position adjacent to one of the sprockets, a series of slats extending crosswise of and between the chains, said slats each having lateral edges and opposite ends, means pivoting each end of each slat to one of the chains, the pivoting means being in each instance located adjacent to one lateral edge only of the slat so that the other edge may ride upon the guide rail to preclude swinging of the slat to a depending dumping position, a guide finger carried by each slat and extending from the pivot means in a direction opposite to the direction of extension of the swingable edge of the slat, flexible loops anchored at intervals relative to the chains at locations adjacent to the pivot axis of each slat, for loosely spanning the slats to provide flexible conveyor pockets, and means at the end of the guide rail to contact the guide fingers of each slat, for rotating the slats about their pivot means in succession as the slats pass around the adjacent sprocket periphery, to provide a loop closure.

8. In a device of the class described, the combination of pairs of spaced sprockets arranged in two parallel planes, endless conveyor chains operating over the sprockets of each pair of sprockets for advancement in unison as the sprockets are rotated, a guide rail extending lengthwise of one of the chains to a position adjacent to one of the sprockets, a series of slats extending crosswise of and between the chains, said slats each having lateral edges and opposite ends, means pivoting each end of each slat to one of the chains, the pivoting means being in each instance located adjacent to one lateral edge only of the slat so that the other edge may ride upon the guide rail to preclude swinging of the slat to a depending dumping position, a guide finger carried by each slat and extending from the pivot means in a direction opposite to the direction of extension of the swingable edge of the slat, flexible loops anchored at intervals relative to the chains at locations adjacent to the pivot axis of each slat, for loosely spanning the slats to provide flexible conveyor pockets, and means at the end of the guide rail to contact the guide fingers of each slat, for rotating the slats about their pivot means in succession as the slats pass around the adjacent sprocket periphery, to provide a loop closure, and a second guide rail for holding the slats against swinging movement to the dumping position, said second guide rail having a terminal end for depriving the slats of support, so that the slats may dump by gravity at said terminal end.

9. In a loop-type elevator-conveyor, the combination of a pair of chains having upwardly and downwardly moving runs, and means including pairs of chain sprockets supporting corresponding runs of the chains in substantial parallelism, means for rotating one pair of the sprockets, a series of slats including means for pivotally mounting them upon opposite corresponding runs of the conveyor chains in spaced parallelism, the pivot means for each slat being offset from the major axis thereof and located adjacent to one longitudinal edge of each slat, so that the opposite longitudinal edge of each slat may swing and describe an arc whose radius is substantially equal to the width of a slat, a series of flexible loops each loosely spanning the space from the pivot means of one slat to the pivot means of an adjacent slat, thereby to provide a series of conveyor pockets each associated with a slat, a loading device for the feeding of articles to the pockets, said loading device having a charging station adjacent to the upwardly moving run of the conveyor, means for swinging the slats in succession to a substantially horizontal position rendering the loops accessible for reception of articles fed by the loading device, and means operating after the loops have passed the charging station, to swing the slats substantially into a common plane for closing the loops upon their contents.

10. A loading device which comprises in combination, pairs of sprockets spaced apart, with corresponding sprockets of each pair disposed in a plane spaced from the plane of the remaining sprockets, means for rotating at least one pair of sprockets, a pair of endless conveyor chains each associated with the sprockets in their respective planes to furnish an upper and a lower run moving in opposite directions, a series of slats each having lateral edges and opposite ends, means pivoting each end of each slat to one of the chains, the pivoting means in each instance being located adjacent to one lateral edge only of the slat so that the other edge may swing by gravity to a depending position when unsupported, a series of flexible loops each spanning loosely the space from the pivot means of one slat to the pivot means of an adjacent slat, thereby to provide a series of conveyor pockets each associated with a slat, means adjacent to one pair of sprockets for tilting the slats in succession to an open-mouthed position rendering the loops receptive of articles to be conveyed, means for charging the successive loops with articles while the slats are so tilted, a series of supports for the slats to maintain a substantially horizontal disposition thereof at the lower run of the conveyor, said supports having termini spaced apart along said lower conveyor run to simultaneously deprive a group of slats of the support necessary to preclude swinging of the slats to the dumping position, and a series of chutes located beneath the termini of the supports for receiving the articles dumped from the loops resulting from the swinging movements of the slats.

11. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions are subject to gravitation to a pendent position for the dumping of articles supported thereon, flexible loops of sheet material extending loosely from slat to slat, and fixed relative to the pivot edge portions only of the slats, whereby the slats in moving about their pivots control accessibility to the loops, guide rails extending in parallelism with the driven elements to support the latter for movement therealong, and a track paralleling one of the guide rails, to provide a support for the swingable edge portions of the slats to preclude swinging movement thereof to a pendent position, said track being severed at one location to remove the support for the swingable edge portions of the slats, thereby subjecting the slats in succession to the action of gravity for dumping the contents of the loops associated therewith.

12. In a flexible loop-type conveyor, the combination of a driven element and a series of dump shelves each in the form of an elongated slat having ends and opposed edges, means at an end of each slat for pivoting the salt to the driven element adjacent to one of said edges thereof, so that the opposite edge of the slat will swing about the pivot means, a series of loops of flexible sheet material each loosely arched longitudinally of and substantially across a slat, said loops each having a hem in which a slat is received, with adjacent loops meeting along a line at an edge of the hem, said line of meeting of the loops being disposed substantially at and in parallelism with the axis of the pivoting means, whereby movement of the swingable edges of the slats to dumping positions pendent from the driven element occurs freely without substantial distortion of the loops.

13. In a conveyor construction, the combination of a pair of spaced parallel conveyor chains each including a succession of links, a plurality of slats each having opposite ends and means pivoting each slat end to a link of each chain, said pivoting means being located adjacent to an edge of each slat whereby the slat may swing to a depending position about its pivot means when unsupported, for dumping an article carried thereon, and a series of individual flexible loops arched across the slats, each of said flexible loops having opposite ends both of which are mounted for traveling with the slats and their chains, and means for effecting such mountings of the loop ends only at locations adjacent to the pivot line of the swingable slats.

14. In a conveyor construction, the combination of a pair of spaced parallel conveyor chains each including a succession of links, a plurality of slats each having opposite ends and means pivoting each slat end to a link of each chain, said pivoting means being located adjacent to an edge of each slat whereby the slat may swing to a depending position about its pivot means when unsupported, for dumping an article carried thereon, and a series of individual flexible loops arched across the slats, each of said flexible loops having opposite ends both of which are mounted for traveling with the slats and their chains, and means for effecting such mountings of the loop ends only at locations adjacent to the pivot line of the swingable slats, the means last mentioned comprising a rod on each slat spaced from the axis of the pivot means thereof for support of the end of one loop, and a hem on the opposite loop end for embracing a slat therein.

15. In a conveyor construction, the combination of a pair of spaced parallel conveyor chains each including a succession of links, a plurality of slats each having opposite ends and means pivoting each slat end to a link of each chain, said pivoting means being located adjacent to an edge of each slat whereby the slat may swing to a depending position about its pivot means when unsupported, for dumping an article carried thereon, and a series of individual flexible loops arched across the slats, each of said flexible loops having opposite ends both of which are mounted for traveling with the slats and their chains, and means for effecting such mountings of the loop ends only at locations adjacent to the pivot line of the swingable slats, the means last mentioned comprising a rod on each slat spaced from the axis of the pivot means thereof for support of the end of one loop, and a hem on the opposite loop end for embracing a slat therein, the arched portion of the loop near said hem being projected in the general direction of the rod carried by that slat which bears the hem.

16. A material transferring apparatus, which comprises a series of successive fabric loops including means for stiffening approximately half the length of each loop, a pair of conveyor chains advancing in unison and including means mounting each loop for rotation about an axis normal to the chains, with the axis of rotation located at approximately the junction of the stiffened portion with the flexible portion of a loop, and means operative as the conveyor chains are advanced, to manipulate the loop portions so that at certain times the materials being transferred rest substantially upon the stiffened portions of the loops, while the flexible portions each assume the position of a cover for such materials, and at other times the materials rest within the flexible portions of the loops while the stiffened portions overhang them as covers.

17. A material transferring apparatus, which comprises a series of successive flexible loops, means near one edge of each loop providing a rigid extension of the loop, a pair of conveyor chains for advancement in unison over a tortuous path and including means for pivoting said rigid extensions thereto at intervals along the chains, the pivoting means for each loop being located near said one edge where the rigid extension meets the flexible portion of the loop, and means operative as the conveyor chains are advanced, for at times disposing the rigid extensions in position to support the material being transferred while the flexible loop portions overlie them as a cover, and at other times disposing the flexible loop portions for support of the materials while the rigid extensions overlie them as covers.

18. In a material handling apparatus of the class described, the combination which comprises substantially parallel upper and lower connected runs of a conveyor moving in opposite directions, a series of flexible pocket structures including means providing a flexible material-receiving loop and a rigid shelf portion constituting a continuation of each loop, means mounting the rigid shelf portion of each pocket for rotation at right angles to the conveyor runs, at spaced intervals on the conveyor runs, the loops of one conveyor run having the rigid shelf portions thereof disposed in substantial parallelism with its associated run and in overhanging relationship to a corresponding loop to provide a substantial closure, and the loops of the other conveyor run lying over their corresponding rigid shelf portions in covering relationship thereto.

19. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions, when unsupported, are subject to gravitation to a pendent position for the dumping of articles supported thereon, flexible loops of sheet material extending loosely from slat to slat, and fixed near the pivot edge portions of the slats, whereby the slats in moving about their pivots control accessibility to the loops, and means providing a temporary support and a release for the swingable edge portions of the slats, to at times preclude swinging movement thereof to a pendent position, while at other times releasing the swingable slats to the action of gravity for dumping the contents of the loops associated therewith.

20. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portions, means pivoting the pivot edge portions of the slats at opposite ends to the driven elements so that the swingable edge portions, when unsupported, are subject to gravitation to a pendent position for the dumping of articles supported thereon, flexible loops of sheet material extending loosely from slat to slat, and fixed near the pivot edge portions of the slats, whereby the slats in moving about their pivots control accessibility to the loops, and means providing a temporary support and a release for the swingable edge portions of the slats, to at times preclude swinging movement thereof to a pendent position, while at other times releasing the swingable slats to the action of gravity for dumping the contents of the loops associated therewith, said means last mentioned being adapted to release a plurality of slats unitarily in dumping the contents as stated.

21. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions are subject to gravitation to a pendent position for the dumping of articles supported thereon, flexible loops of sheet material extending loosely from slat to slat, and supported close to the pivot edge portions of the slats, whereby the slats in moving about their pivots control accessibility to the loops, and a track paralleling one of the driven elements of the conveyor, to provide a support for the swingable edge portions of the slats to preclude swinging movement thereof to a pendent position, said track being severed at one location to remove the support for the swingable edge portions of the slats, thereby subjecting the slats to the action of gravity for dumping the contents of the loops associated therewith, as the slats reach the severed portion of the track.

22. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions are subject to gravitation to a pendent position for the dumping of articles supported thereon, flexible loops of sheet material extending loosely from slat to slat, and supported close to the pivot edge portions of the slats, whereby the slats in moving about their pivots control accessibility to the loops, and a track paralleling one of the driven elements of the conveyor, to provide a support for the swingable edge portions of the slats to preclude swinging movement thereof to a pendent position, said track being severed at one location to remove the support for the swingable edge portions of the slats, thereby subjecting the slats to the action of gravity for dumping the contents of the loops associated therewith, as the slats reach the severed portion of the track, and means beyond the severed portion of the track for directing the driven elements of the conveyor substantially at right angles to the track while maintaining the pendent condition of the slats.

23. In a flexible loop-type conveyor, the combination which comprises a pair of spaced parallel driven elements movable in unison and forming the sides of the conveyor, a plurality of dump shelves in the form of slats each having a pivot edge portion, and an opposed edge portion swingable about the pivot edge portion, means pivoting the pivot edge portions of the slats at opposite ends to the driven elements so that the swingable edge portions are subject to gravitation to a pendent position for the dumping of articles supported thereon, flexible loops of sheet material extending loosely from slat and slat, and supported close to the pivot edge portions of the slats, whereby the slats in moving about their pivots control accessibility to the loops, and a track paralleling one of the driven elements of the conveyor, to provide a support for the swingable edge portions of the slats to preclude swinging movement thereof to a pendent position, said track being severed at one location to remove the support for the swingable edge portions of the slats, thereby subjecting the slats to the action of gravity for dumping the contents of the loops associated therewith, as the slats reach the severed portion of the track, means beyond the severed portion of the track for directing the driven elements of the conveyor substantially at right angles to the track while maintaining the pendent condition of the slats, means for reversing the direction of conveyor travel last mentioned, and means including a guide to incline the swingable edge portions of the slats above the pivot edge portions thereof, for acceptance of articles to be delivered into the spaces between successive slats.

24. In a flexible loop-type conveyor, the combination which comprises a pair of spaced rotatable wheels axially aligned and a pair of spaced parallel conveyor elements each supported upon a wheel to provide an upper and a lower conveyor reach movable in opposite directions upon rotation of said wheels in unison, a plurality of article supports in the form of shelves slat-like in character, each shelf having a pivot edge portion, and an opposed edge portion swingable about the pivot edge portion, means located at spaced intervals along the conveyor reaches for pivoting the pivot edge portions of the shelves at opposite ends to the conveyor reaches so that the swingable edge portions are subject to gravitation to a pendent position for the dumping of articles supported thereon, flexible loops of sheet material extending loosely from shelf to shelf and supported thereby close to the pivoting axes of the shelves, providing open-topped pockets each spanning the space between pivoting axes of successive shelves, guide means along at least one of the upper conveyor reaches for supporting the shelves against gravitational swinging and in substantial covering relationship to the pocket-forming loops, a second guide means along at least one of the lower conveyor reaches for supporting the shelves against gravitational swinging while the loops are inverted due to passing of the conveyor elements about their supporting wheels, and means in the region of one of said wheels for limiting rotational movement of the shelves by gravity to inverted positions, as the shelves pass over the wheels from the upper to the lower reaches of the conveyor elements, thereby preventing premature discharge of articles from the pockets as the articles shift from the loops to the shelves in passing about the peripheries of the wheels.

25. In a flexible loop-type conveyor, the combination which comprises a pair of spaced rotatable wheels axially aligned and a pair of spaced parallel conveyor elements each supported upon a wheel to provide an upper and a lower conveyor reach movable in opposite directions upon rotation of said wheels in unison, a plurality of article supports in the form of shelves slat-like in character, each shelf having a pivot edge portion, and an opposed edge portion swingable about the pivot edge portion, means located at spaced intervals along the conveyor reaches for pivoting the pivot edge portions of the shelves at opposite ends of the conveyor reaches so that the swingable edge portions are subject to gravitation to a pendent position for the dumping of articles supported thereon, flexible loops of sheet material extending loosely from shelf to shelf and supported thereby close to the pivoting axes of the shelves, providing open-topped pockets each spanning the space between pivoting axes of successive shelves, guide means along at least one of the upper conveyor reaches for supporting the shelves against gravitational swinging and in substantial covering relationship to the pocket-forming loops, a second guide means along at least one of the lower conveyor reaches for supporting the shelves against gravitational swinging while the loops are inverted due to passing of the conveyor elements about their supporting wheels, and means in the region of one of said wheels for limiting rotational movement of the shelves by gravity to inverted positions, as the shelves pass over the wheels from the upper to the lower reaches of the conveyor elements, thereby preventing premature discharge of articles from the pockets as the articles shift from the loops to the shelves in passing about the peripheries of the wheels, said second guide means having a gap at a distance from the wheels, where the support for the shelves is removed to permit swinging movement of the shelves to dumping position.

SIGMUND SCHIFF.